(12) United States Patent
Gradu et al.

(10) Patent No.: US 7,670,059 B2
(45) Date of Patent: Mar. 2, 2010

(54) VEHICLE CORNER MODULE

(75) Inventors: Mircea Gradu, Massillon, OH (US);
John D. Dougherty, Canton, OH (US);
Christopher W. Henson, Troy, MI (US)

(73) Assignee: The Timken Company, Canton, OH (US)

( * ) Notice: Subject to any disclaimer, the term of this patent is extended or adjusted under 35 U.S.C. 154(b) by 186 days.

(21) Appl. No.: 11/751,373

(22) Filed: May 21, 2007

(65) Prior Publication Data
US 2008/0252030 A1 Oct. 16, 2008

Related U.S. Application Data

(60) Provisional application No. 60/912,060, filed on Apr. 16, 2007.

(51) Int. Cl.
*F16C 13/00* (2006.01)
(52) U.S. Cl. .................... 384/589; 464/178
(58) Field of Classification Search ................ 464/178, 464/182, 906; 384/544, 589
See application file for complete search history.

(56) References Cited

U.S. PATENT DOCUMENTS

| | | | |
|---|---|---|---|
| 4,893,960 A | 1/1990 | Beier et al. | |
| 5,806,936 A | 9/1998 | Guimbretiere | |
| 6,299,360 B1 | 10/2001 | Dougherty et al. | |
| 6,601,994 B2 | 8/2003 | Hacker | |
| 6,616,340 B2 | 9/2003 | Hacker | |
| 6,648,518 B2 * | 11/2003 | Uchman | 384/544 X |
| 6,659,650 B2 * | 12/2003 | Joki et al. | 384/589 X |
| 6,739,978 B2 | 5/2004 | Hacker et al. | |
| 6,749,517 B2 | 6/2004 | Ouchi | |
| 6,886,987 B2 * | 5/2005 | Shevket et al. | 384/589 X |
| 2002/0044706 A1 * | 4/2002 | Kayama et al. | 384/544 X |

FOREIGN PATENT DOCUMENTS

GB 2191267 12/1987

* cited by examiner

*Primary Examiner*—Greg Binda
(74) *Attorney, Agent, or Firm*—Polster, Lieder, Woodruff & Lucchesi, L.C.

(57) ABSTRACT

A corner module for an automotive vehicle includes a suspension upright, a wheel end, and a CV joint. The wheel end has a housing that is secured to the suspension upright and a hub that is provided with a flange to which a road wheel is attached and also spindle that projects from the flange into the housing. In addition, the wheel end has a tapered roller bearing located between the housing and the hub spindle. The CV joint drives the hub through a coupler ring or an inboard bearing cone that fits around and is engaged with the hub spindle, all through mating splines. The CV joint may have a stub shaft that projects from the bell through the hub spindle to clamp the CV joint and hub spindle together. Torque is transferred to the hub spindle at a large diameter through the bell of the CV joint. When present, the stub shaft serves merely to hold the CV joint and hub spindle together and thus may exist at a small diameter. Because the bearing transfers radial and thrust loads through tapered rollers, it and the wheel end of which it is a part may exist in configurations smaller than their counterparts in traditional wheel ends.

6 Claims, 3 Drawing Sheets

VEHICLE CORNER MODULE

CROSS-REFERENCE TO RELATED APPLICATIONS

This application derives and claims priority from U.S. provisional patent application 60/912,060 filed Apr. 16, 2007, which is incorporated herein by reference.

TECHNICAL FIELD

This invention relates in general to corner modules for automotive vehicles and, more particularly, to a corner module that utilizes a wheel end of reduced size.

BACKGROUND OF THE INVENTION

Automobiles and light trucks of current manufacture contain many components that are acquired in packaged form from outside suppliers. The packaged components reduce the time required to assemble automotive vehicles and further improve the quality of the vehicles by eliminating critical adjustments from the assembly line. So-called "wheel ends" represent one type of packaged component that has facilitated the assembly of automotive vehicles. A wheel end together with other components to which the wheel end is connected form part of a so-called "corner module".

The typical wheel end has a housing that is bolted against a steering knuckle or other suspension upright, a hub provided with a flange to which a road wheel is attached and also a spindle that projects from the flange into the housing, and an antifriction bearing located between the housing and the hub spindle to enable the hub to rotate in the housing with minimal friction. If the road wheel propels the vehicle, the hub of the wheel end is coupled to an axle shaft through a constant velocity (CV) joint, which also forms part of the corner module.

The typical CV joint has a bell, which contains components for accommodating misalignment between the axle shaft and the hub, and also a stub shaft that projects through the hub. The stub shaft serves to clamp the CV joint to the hub and to transfer drive torque from the axle shaft to the hub. To this end, the stub shaft has an external spline that mates with an internal spline in the hub.

The bearings currently used in wheel ends for most automobiles require raceways of substantial diameter. As a consequence, the hub is quite large. As such, it can accommodate a stub shaft of a diameter great enough to transfer torque from the axle shaft to the road wheel. But tapered roller bearings transfer equivalent loads with raceways of lesser diameter. Even so, the wheel end must remain essentially the same size, because the drive torque cannot be transferred through a stub shaft of lesser diameter.

The present invention eliminates the stub shaft of the CV joint from the torque transfer path and indeed changes the torque transfer path to a larger diameter. Thus, the stub shaft does not limit the size of the bearing and the wheel end of which the bearing is a part.

SUMMARY OF THE INVENTION

The present invention resides in a corner module for an automotive vehicle. The module includes a wheel end of reduced size because it utilizes a tapered roller bearing between the spindle of its hub and its surrounding housing that attaches to a suspension upright. The module also includes a CV joint having a bell through which it drives the spindle at a relatively large diameter. The CV joint does not transfer torque to the hub spindle through a stub shaft and hence the diameter of the stub shaft, if present, may be quite small in keeping with the wheel end clamping requirements.

DETAILED DESCRIPTION

Figure 1:
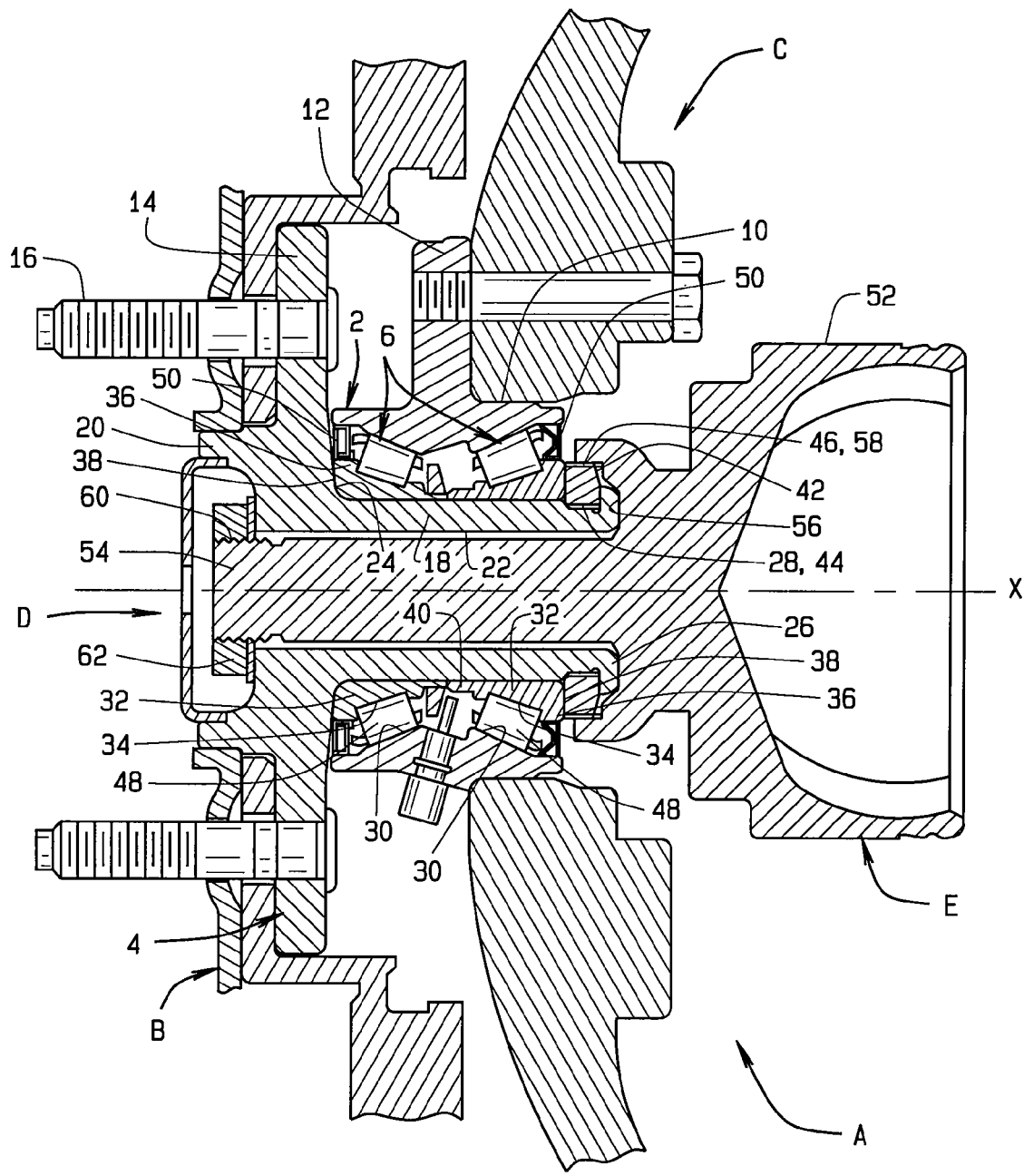
FIG. 1 is a longitudinal sectional view of a corner module constructed in accordance with and embodying the present invention.

A corner module A (FIG. 1) for an automotive vehicle basically serves to support a corner of the vehicle on a road wheel B at that corner and to transfer drive torque to the road wheel B, so that the wheel B will propel the vehicle. The corner module A includes a suspension system component C, such as a steering knuckle or other suspension upright, and a wheel end D that couples the road wheel B to the suspension system component C to enable the wheel B rotate beyond the component C about an axis X while transferring both radial and thrust loads between the two. In addition, the corner module A includes a constant velocity (CV) joint E that transfers drive torque to the wheel end D which in turn transfers it to the road wheel B. The wheel end D basically includes a housing 2 that is bolted to the suspension system component C, a hub 4 to which the road wheel B and CV joint E are attached, and an antifriction bearing 6 located between the housing 2 and the hub 4 to enable the latter to rotate with respect to the former about the axis X.

The housing 2 has a generally cylindrical body 10 and a flange 12 that projects outwardly from the body 10 intermediate the ends of the body 10. The inboard portion of the body 10 fits into the suspension system component C, while the flange 12 fits against the component C and receives bolts that secure the housing 2 to the component C.

The hub 4 has a drive flange 14 that projects outwardly past the outboard end of the housing 2 and serves as a mount for the road wheel B and for a brake disk or drum as well. They are secured to the flange 14 with lug bolts 16 that project from the flange 14. In addition, the hub 4 has a spindle 18 the projects axially into the housing 2 and a wheel pilot 20 that projects axially in the opposite direction to center the road wheel B on the hub 4. Both the spindle 18 and pilot 20 are hollow. Indeed, the spindle 18 contains a through bore 22 that is generally uniform in diameter. It opens out of the outboard end of the hub within the pilot 20. Externally, the spindle 18, where it merges with the flange 14, has a shoulder 24, while at its opposite end it is deformed outwardly in the provision of a formed end 26 that lies beyond the bearing 6. The formed end 26 provides an abutment that is presented toward the shoulder 24. U.S. Pat. Nos. 6,443,622 and 6,532,666 describe processes for upsetting the end of the spindle 18 to provide the formed end 26 and are incorporated herein by reference. The spindle 18 also has an external spline 28 that leads up to the formed end 26.

The bearing 6 enables the hub 4 to rotate relative to the housing 2 about the axis X. It includes outer raceways 30 that are presented inwardly toward the axis X and taper downwardly toward each other. They may be internal surfaces on the housing 2 itself. The bearing 6 also includes two inner races in the form of outboard and inboard cones 32. Each cone 32 has a tapered raceway 34 that leads up to a thrust rib 36 at its large end, and the thrust rib 36 in turn leads out to a back face 38 that lies perpendicular to the axis X. The tapered raceway 34 of the outboard cone 32 is presented outwardly toward the outboard outer raceway 30 and is inclined in the same direction. The tapered raceway 34 of the inboard cone 32 is presented outwardly toward the inboard outer raceway 30 and is inclined in the same direction as that raceway 30. The inboard cone 32 beyond the small end of its raceway 30 has an axially directed extension 40 that leads out to and abuts the corresponding end of the outboard cone 32. The back face of the outboard cone 32 abuts the shoulder 24 where the hub flange 14 and spindle 18 merge. The back face 38 of the inboard cone 32 is presented toward, yet spaced from, the formed end 26 of the spindle 18. Captured between the back face 38 of the inboard cone 32 and the formed end 26 is a coupler ring 42 having an internal spline 44 that mates with the external spline 28 on the spindle 18. The ring 42 also has an external spline 46.

In addition to its outer raceways 30 and cones 32, the bearing 6 has rolling elements in the form of tapered rollers 48 arranged in outboard and inboard rows. The rollers 48 of outboard row lie between and contact the outboard raceways 30 and 32, whereas the rollers 48 of the inboard row lie between and contact the inboard raceways 30 and 32. The geometry is such that the rollers 48 transfer radial loads between the housing 2 and hub spindle 18 and thrust loads in both axial directions as well. Moreover, the rollers 48 of each row are on apex, meaning that the conical envelopes in which their tapered side faces lie and the conical envelopes in which the tapered raceways 30 and 32 that they contact lie have their apices at a common point along the axis X. The length of the axial extension 40 on the inboard cone 32 determines the setting for the bearing 6, and preferably that setting is a slight preload, so that no internal clearances exist in the bearing 6.

The annular spaces between the ends of the housing 2 and the cone thrust ribs 36 are closed by seals 50.

The CV joint E transfers torque from an axle shaft (not shown) to the hub 4 of the wheel end A. It includes a bell 52 that lies beyond the inboard end of the wheel end A and a stub shaft 54 that projects from the bell 52 through the wheel end A. The bell 52 contains components that enable an axle shaft to transfer torque to the CV joint E while accommodating misalignment between the axle shaft and the axis X of the wheel end D.

The bell 52 flares outwardly behind the formed end 26 at the inboard end of the spindle 18 to provide a shoulder 56 that abuts the end face of the formed end 26 on the hub spindle 18. Outwardly, beyond the shoulder 56, the bell 52 overlies the coupler ring 42 at the inboard end of the spindle 18, and here it is provided with an internal spline 58 that mates with and engages the external spline 46 on the coupler ring 42. Thus, torque that is applied to the CV joint E is transferred to the hub 4 of the wheel end D at the mating splines 46 and 58 and at the mating splines 44 and 28. The stub shaft 54 projects from the bell 52 through the through bore 22 of the hub spindle 18 and out of the opposite end of the hub 4, terminating within the wheel pilot 20. Here it is provided with external threads 60 over which a nut 62 is threaded. The nut 62 is turned down against the outboard end face of the hub 18, thus clamping the CV joint E and the hub 4 of the wheel end D together, with the shoulder 56 of the bell 52 bearing snugly against the formed end 26 on the hub spindle 18. Other securing devices may be utilized to hold the hub 4 and CV joint E together.

When the bell 52 and stub shaft 54 of the CV joint E rotate as a consequence of drive torque applied to them by an axle shaft, that drive torque transfers to the spindle 18 of the wheel hub 4 through the engaged splines 58 and 46 on the bell 52 and coupler ring 42, respectively, and through the engaged splines 44 and 28 on the ring 42 and spindle 18, respectively. The hub 4, of course, transfers the torque to the road wheel B. Since the stub shaft 54 does not transfer any torque, it may be made considerably smaller than the stub shafts of current CV joints. This enables the hub spindle 18, the bearing 6, and the housing 2 of the wheel end D to exist at smaller diameters—or in other words, it accommodates a more compact and lighter wheel end D. The drive torque transfers through the mating splines 58 and 46 on the bell 52 and coupler ring 42, respectively, and through the splines 44 and 28 on the coupler ring 42 and hub spindle 18, respectively, at diameters large enough to accommodate that torque.

Whereas, with a conventional corner module the diameter of the stub shaft and its spline represent limiting factors, with the corner module A the diameter of the stub shaft 54 can be quite small, thus permitting use of a smaller tapered roller bearing 6 in the wheel end D. This derives from the removal of the torque transfer function from the stub shaft 54 and relocating it to the bell 52 of the CV joint E at a considerably greater diameter. The smaller tapered roller bearing 6, in comparison to more traditional bearings used in wheel ends, occupies less space, requires less bearing steel, and is lighter in weight. Yet it can accommodate the same or even greater radial and axial loads.

In other words, by changing the torque transfer path, the diameter of the stub shaft 54 can be reduced to that required to withstand the stresses caused by clamping the wheel end D to the CV joint E. This reduction in shaft diameter enables maximum radial downsizing of the inner and outer diameters on the hub spindle 18 as well as the size of the bearing 6. Indeed, the use of a tapered roller bearing enables the bearing size to be reduced substantially compared to other bearing types, such as ball bearing. The size reductions enable a considerable weight reduction of the corner module A which results in improved vehicle dynamics by lowering the unsprung mass of the vehicle.

Figure 2:
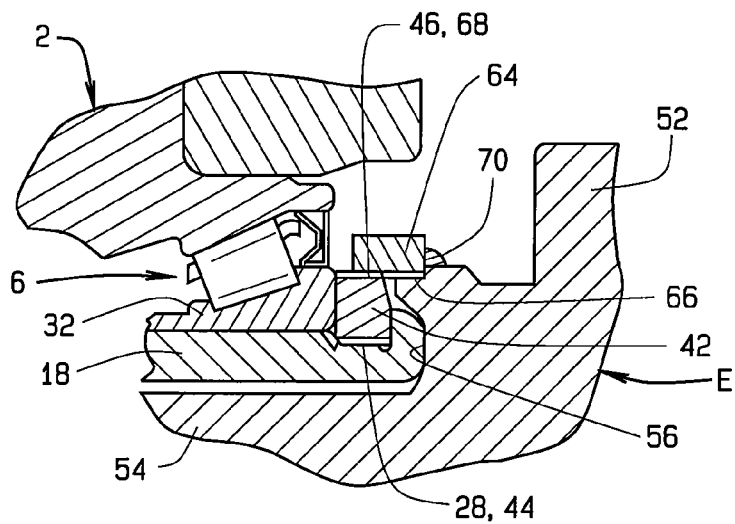
FIG. 2 is a fragmentary sectional view of a corner module showing a separate transfer ring for transferring torque from the CV joint to the hub of a wheel end forming part of the corner module.

In lieu of transferring the torque directly from the bell 52 of the CV joint E to the coupler ring 42 (FIG. 2) or the hub spindle 18, the torque may transfer through a transfer ring 64 that fits over the end of the bell 52. In this regard, the bell 52 at its end has an external spline 66. The transfer ring 64 has an internal spline 68 that engages both the external spline 46 on the coupler ring 42 and the external spline 66 on the bell 52. The transfer ring 64 is secured and thereby prevented from displacing axially by a weld 70 formed between its inboard end and the bell 52.

Figure 3:
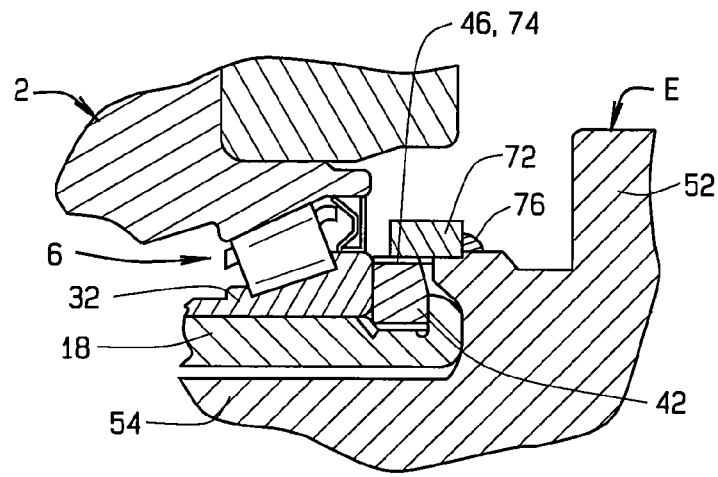
FIG. 3 is a fragmentary sectional view showing a modified transfer ring.

A modified transfer ring 72 (FIG. 3) has an internal spline 74 that engages the external spline 46 on the coupler ring 42, whereas the remainder of the internal surface on the ring 72 is cylindrical. The end of the bell 52 is likewise cylindrical, and here the ring 72 fits over the bell 52. The ring 72 is attached firmly to the bell 52 through a weld 76 at the inboard end of the ring 72.

Figure 4:
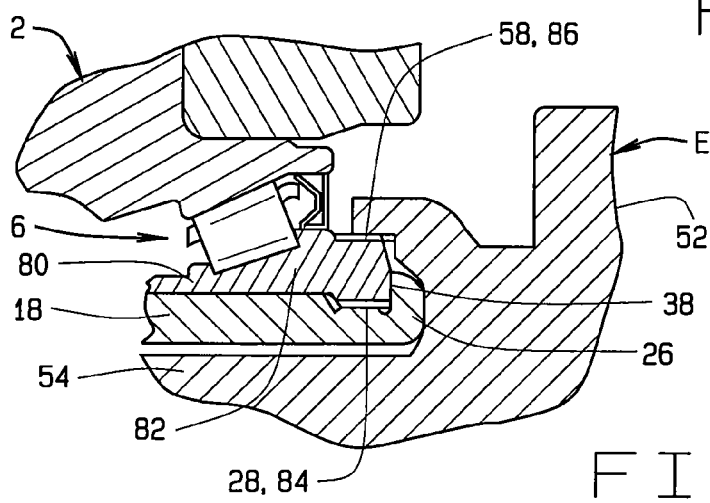
FIG. 4 is a fragmentary sectional view showing a modified bearing cone through which torque is transferred from the CV joint to the hub.

The CV joint E may transfer the torque applied to it to the bearing 6 which in turn transfers it to the hub spindle 18. To this end, the bearing 6 is a modified inboard cone 80 (FIG. 4) having an extended thrust rib 82. The cone 80 also has an internal spline 84 that leads out to its back face 38. The internal spline 84 engages the external spline 28 on the hub spindle 18. The extended thrust rib 82 has an external spline 86 that engages the internal spline 58 in the bell 52 of the CV joint E, or the external spline 86 may be engaged by one of the transfer rings 64 or 72 fitted over the bell 52.

Figure 5:
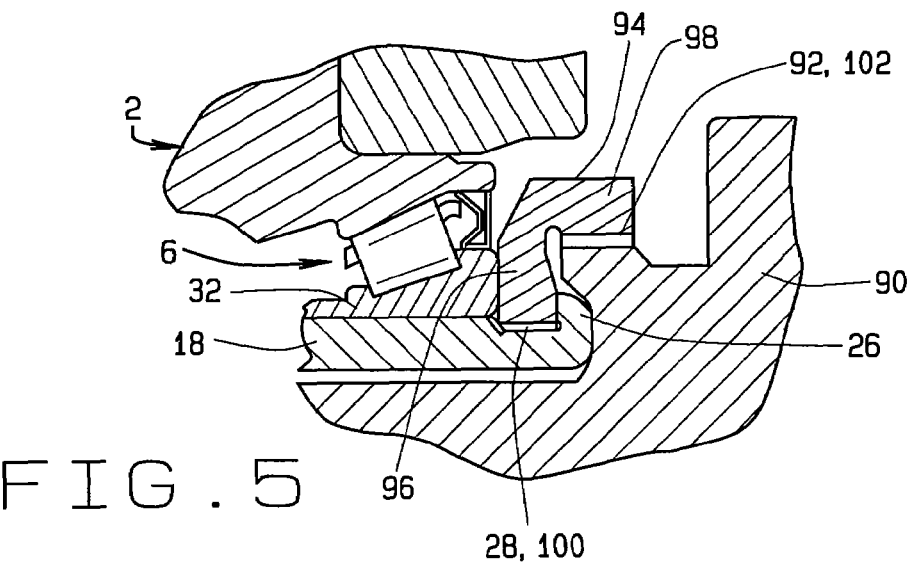
FIG. 5 is a fragmentary sectional view showing a modified CV joint and a modified coupler ring.

In lieu of having an internal spline, a slightly modified bell 90 (FIG. 5) for the CV joint E has an external spline 92. Drive torque transfers from the bell 90 to the hub spindle 18 through a modified transfer ring 94 that possesses an L-shaped configuration. More specifically, the transfer ring 94 has a radial segment 96 that is clamped between the back face 38 of the inboard cone 32 and the formed end 26 and an axial segment 98 that projects from the radial segment 96 over the external spline 92 on the bell 90. The radial segment 96 has an internal spline 100 that engages the external spline 28 on the hub spindle 18, whereas the axial segment 98 has an internal spline 102 that engages the external spline 92 on the bell 90.

The external spline 92 on the bell 90 of the CV joint E may have a slight helic angle so as to create an interference fit with the internal spline 102 on the axial segment 98 of the coupler ring 94.

Figure 6:
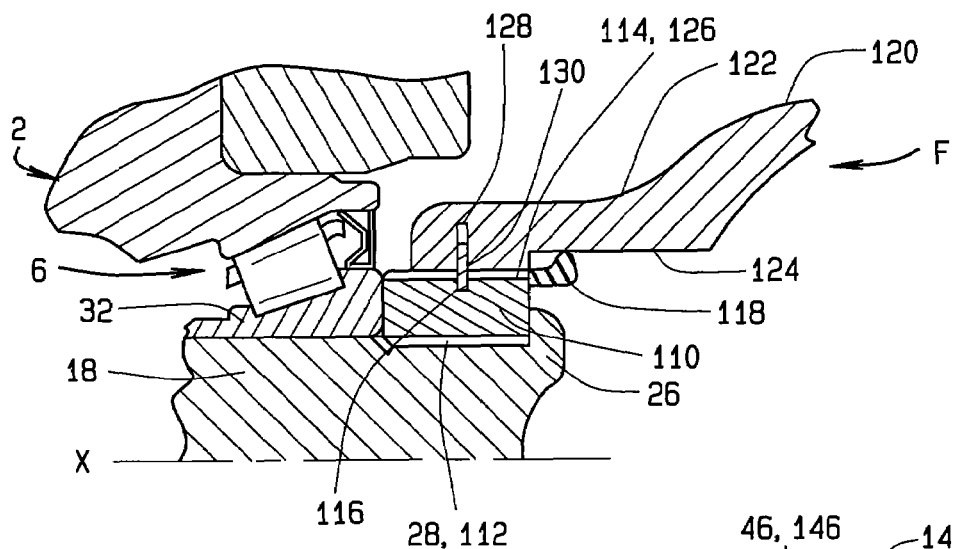
FIG. 6 is a fragmentary sectional view showing another modified CV joint without a stub shaft and a modified coupler ring.

The same concept of rerouting the torque path may be used with a CV joint F (FIG. 6) that has no stub shaft 54 or shoulder 56. As a consequence, the hub spindle 18 may be solid. That spindle 18 supports a slightly modified coupler ring 110—one that is of somewhat extended length, but nevertheless has internal and external splines 112 and 114, respectively. The internal spline 112 engages the external spline 28 on the hub spindle 18. Along its external spline 114 an annular groove 116 opens out of the coupler ring 110 midway between its ends. Finally, the coupler ring 110 has an elastomeric seal by 118 bonded to it at its inboard end, and it projects axially over the formed end 26 and at its end turns radially outwardly.

The CV joint F includes a bell 120 provided with a reduced axially directed section 122 that forms the very end of the CV joint F. Thus, the CV joint F has no stub shaft. The end section 122 contains a cylindrical sealing surface 124 and an internal spline 126 to which the sealing surface 124 leads. It also has an annular groove 128 that opens inwardly out of the spline 126.

The end section 122 of the bell 120 fits over the coupler ring 110 that is around the hub spindle 18, with the internal spline 126 on the end section 122 engaging the external spline 114 on the coupler ring 110. When the bell 120 is so disposed, the seal lip 118 bears against the internal sealing surface 124 on the end section 122 and establishes a generally static fluid barrier along the surface 124. Moreover, the end section 122 generally midway between the ends of its internal spline 112 has an annular groove 128 that opens inwardly.

The two grooves 116 and 128 align and receive a cir-clip 130 that prevents the bell 120 from separating from the coupler ring 110. The cir-clip 130 is split so that it can be expanded to pass over the external spline 114 on the coupler ring 110 while in the groove 130 of the end section 122 of the bell 120. In this regard, the groove 128 in the end section 122 is deep enough to accommodate the expansion.

Figure 7:
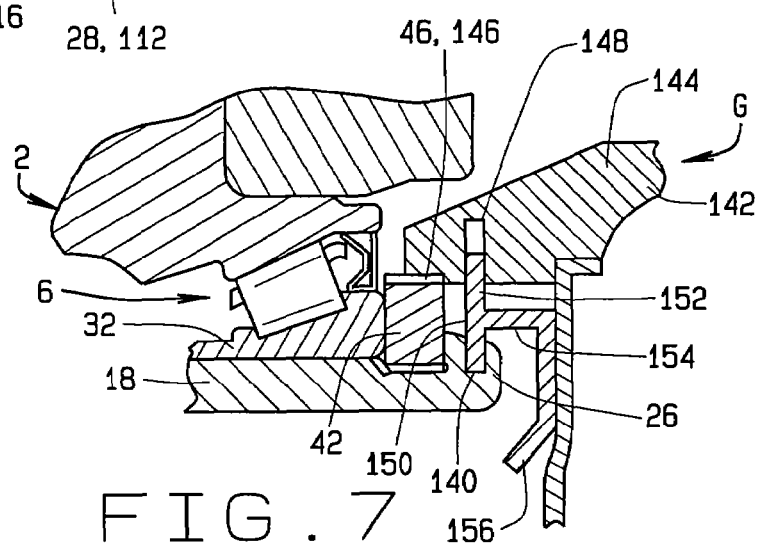
FIG. 7 is a fragmentary sectional view showing still another modified CV joint as well as a modified hub spindle.

Another CV joint G (FIG. 7) couples to the hub 4 through the coupler ring 42 on the hub spindle 18, but the hub spindle 18 is modified slightly in that it has an annular groove 140 that opens radially out of its formed end 26. The CV joint G has a bell 142 and a reduced end section 144 that extends over the coupler ring 42. Indeed, the end section 144 contains an internal spline 146 that engages the external spline 46 on the coupler ring 42. Within the spline 46 the end section 144 has an annular groove 148 that aligns with the groove 140 in the formed end 26 of the hub spindle 18. The two grooves 140 and 148 receive a snap ring 150 that prevents the CV joint G from separating from the spindle 18 of the hub 4.

To this end, the snap ring 150 has a radial section 152 that spans the space between the formed end 26 of the spindle 18 and the end section 144 of the bell 142, yet is received in the grooves 140 and 148 of both. However, the groove 148 in the end section 144 extends outwardly beyond the periphery of the radial section 152 a distance great enough to allow the radial section 152 to expand sufficiently to free itself of the groove 140 in the formed end 26. In this regard, the snap ring 150 is not continuous circumferentially, but is instead split so that it can expand against its natural bias and contract under that bias. The snap ring 150 also has an axial section 154 that projects axially away from the radial section 152 in the space between the end section 144 on the bell 142 and the formed end 26 on the hub spindle 18. Finally, the snap ring 150 has a tail section 156 that turns radially inwardly from the end of the axial section 154 and is accessible at the inboard end of the through bore 22 that extends through the hub spindle 18.

The outer raceways 30 need not be surfaces in the housing 2, but may instead be on separate outer races, called cups, fitted into the housing or on a single outer race called a double cup. On the other hand, the outboard cone 32 may be integrated into the spindle 18, so that the outboard inner raceway 34 and the rib face at the large end of that raceway 34 are surfaces on the spindle 18. However, the inboard cones 32 and 76 preferably should remain as a separate component to permit assembly of the bearing 6 and provide for adjustment of it.

The invention claimed is:

1. A corner module for an automotive vehicle, said corner module being organized about an axis of rotation and comprising:
   (a) a wheel end having an outboard end and an inboard end and including:
      (i) a housing configured for attachment to a suspension upright on the automotive vehicle;
      (ii) a hub having a drive flange located beyond the outboard end of the housing and a spindle projecting from the drive flanges into the housing, the spindle containing a through bore and having at its inboard end an abutment that is directed radially outwardly;
      (iii) an antifriction bearing located between the housing and the hub spindle and including outboard and inboard outer raceways that are carried by the housing and taper in opposite directions with respect to the axis, outboard and inboard inner raceways that are carried by the hub spindle and taper in opposite directions with respect to the axis, with the outboard inner raceway tapering in the same direction as the outboard outer raceway and the inboard inner raceway tapering in the same direction as the inboard outer raceway, and tapered rollers arranged in an outboard row between the outboard raceways and in an inboard row between the inboard raceways, and an initially separate cone located around the spindle, with the inboard inner raceway being on the cone;
      (iv) a coupler ring located around the spindle and having a radial segment that is engaged with the spindle and is captured between the abutment on the spindle and the cone that is around the spindle, the coupler ring also having an axial segment that projects axially from the radial segment away from the cone and encircles the abutment, the axial segment containing an internal spline;

(b) a CV joint including:
 (i) a bell located against the inboard end of the spindle and projecting into the axial segment of the coupler ring where it is provided with an external spline that engages the internal spline in the axial segment, and
 (ii) a stub shaft that projects from the bell into the through bore of the spindle and is secured against axial displacement in the hub spindle such as to clamp the bell against the inboard end of the spindle.

2. A corner module according to claim 1 wherein the hub spindle has an external spline and the radial segment of the coupler ring has an internal spline that engages the external spline on the hub spindle.

3. A corner module according to claim 1 wherein the stub shaft projects completely through and out of the through bore in the hub spindle, and further comprising a nut threaded over the end of the stub shaft and against the hub, so as to draw the bell against the inboard end of the hub spindle.

4. A corner module according to claim 1 wherein the bell and stub shaft of the CV joint are formed integral.

5. A corner module according to claim 1 wherein radial and axial segments of the coupler ring are formed integral.

6. A corner module according to claim 1 wherein the abutment is on a formed end that turns outwardly away from the axis and is integral with the remainder of the spindle.

* * * * *